US012613542B2

(12) United States Patent
Park et al.

(10) Patent No.: US 12,613,542 B2
(45) Date of Patent: Apr. 28, 2026

(54) REGULATOR CIRCUIT AND OPERATING METHOD FOR THE SAME

(71) Applicant: MagnaChip Semiconductor, Ltd., Cheongju-si (KR)

(72) Inventors: Jusang Park, Cheongju-si (KR); Hyoungkyu Kim, Cheongju-si (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 337 days.

(21) Appl. No.: 18/319,804

(22) Filed: May 18, 2023

(65) Prior Publication Data

US 2024/0210977 A1 Jun. 27, 2024

(30) Foreign Application Priority Data

Dec. 26, 2022 (KR) ........................ 10-2022-0183970

(51) Int. Cl.

| | |
|---|---|
| ***G05F 1/575*** | (2006.01) |
| ***G05F 1/56*** | (2006.01) |
| ***G05F 1/59*** | (2006.01) |
| ***G05F 1/595*** | (2006.01) |

(52) U.S. Cl.

CPC .............. *G05F 1/575* (2013.01); *G05F 1/561* (2013.01); *G05F 1/59* (2013.01); *G05F 1/595* (2013.01)

(58) Field of Classification Search

CPC .......... G05F 1/575; G05F 1/595; G05F 1/561; G05F 1/59; G05F 1/461

See application file for complete search history.

(56) References Cited

U.S. PATENT DOCUMENTS

| | | | | |
|---|---|---|---|---|
| 5,629,608 | A * | 5/1997 | Budelman | G05F 1/618 323/284 |
| 2019/0079552 | A1* | 3/2019 | Yasusaka | G05F 1/461 |
| 2020/0091715 | A1 | 3/2020 | Han | |
| 2024/0176375 | A1* | 5/2024 | Tan | G05F 1/575 |
| 2024/0210976 | A1* | 6/2024 | Nam | G05F 1/577 |

* cited by examiner

*Primary Examiner* — Crystal L Hammond
*Assistant Examiner* — Jonathan Walter Soileau
(74) *Attorney, Agent, or Firm* — NSIP Law

(57) ABSTRACT

A regulator circuit includes a first regulator configured to supply a first current to a VDD pad connected to a power line based on a first output voltage, and a second regulator configured to supply a second current to the VDD pad based on a second output voltage. The second output voltage has dropped by a predetermined delta voltage from the first output voltage.

12 Claims, 8 Drawing Sheets

REGULATOR CIRCUIT AND OPERATING METHOD FOR THE SAME

CROSS REFERENCE TO RELATED APPLICATION

This application claims the benefit under 35 USC § 119(a) of Korean Patent Application No. 10-2022-0183970, filed Dec. 26, 2022, in the Korean Intellectual Property Office, the entire disclosure of which is incorporated by reference for all purposes.

BACKGROUND

1. Field

The following description relates to a regulator circuit and an operating method for the same.

2. Description of Related Art

A low dropout regulator (hereinafter referred to as an LDO regulator) is a device that regulates a supply voltage, which is input as power, to an output voltage with a level suitable for an internal device in a power supply module for an electronic device.

In conventional LDO regulator circuits, problems may occur when the load fluctuates rapidly. For example, a conventional LDO regulator circuit may be disadvantageous because when the load fluctuations increase beyond a certain limit, a load current increases, and the output voltage (VOUT) does not maintain a constant voltage level.

Furthermore, in order to compensate for the voltage drop in the output voltage (VOUT) due to load fluctuations, a switching circuit is sometimes added to the conventional regulator circuit, but the switching operation of the added switching circuit may cause an overshoot or undershoot of the output voltage (VOUT), which may cause reliability problems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a regulator circuit includes a first regulator configured to supply a first current to a VDD pad connected to a power line based on a first output voltage, and a second regulator configured to supply a second current to the VDD pad based on a second output voltage. The second output voltage has dropped by a predetermined delta voltage from the first output voltage.

The first regulator may include a first output terminal connected to the VDD pad, a first error amplifier configured to output a first voltage by amplifying a difference between a first reference voltage and a first feedback voltage, a first pass transistor configured to regulate an amount of the first current output through the first output terminal based on the first voltage, and a first voltage divider having a first resistor and a second resistor connected between the first output terminal and a ground terminal and configured to feedback the first feedback voltage generated by the first resistor and the second resistor to the first error amplifier.

The second regulator may include a second output terminal connected to the VDD pad, a second error amplifier configured to output a second voltage by amplifying a difference between a second reference voltage and a second feedback voltage, a second pass transistor configured to regulate an amount of the second current output through the second output terminal based on the second voltage, and a second voltage divider having a third resistor and a fourth resistor connected between the second output terminal and a ground terminal and configured to feedback the second feedback voltage generated by the third resistor and the fourth resistor to the second error amplifier.

The first output terminal and the second output terminal may be connected to each other.

The first output voltage may be ((1+a value of the first resistor/a value of the second resistor)×the first reference voltage), and the second output voltage may be ((1+a value of the third resistor/a value of the fourth resistor)×the second reference voltage). The first resistor, the second resistor, the third resistor, the fourth resistor, the first reference voltage, and the second reference voltage may be determined such that the second output voltage is smaller than the first output voltage by the delta voltage.

The first reference voltage and the second reference voltage may be identical to each other. A resistance ratio between the first resistor and the second resistor and a resistance ratio between the third resistor and the fourth resistor may be determined differently such that the second output voltage is smaller than the first output voltage by the delta voltage.

A resistance ratio between the first resistor and the second resistor and a resistance ratio between the third resistor and the fourth resistor may be identical to each other. The first reference voltage and the second reference voltage may be determined differently such that the second output voltage is smaller than the first output voltage by the delta voltage.

In another general aspect, a method of operating a regulator circuit includes a first regulator and a second regulator that supply currents to a VDD pad connected to a power line. The method includes supplying, by the first regulator, a current to the VDD pad in response to a voltage of the VDD pad being greater than or equal to a second output voltage; and supplying the currents to the VDD pad through the first regulator and the second regulator in response to the voltage of the VDD pad being smaller than the second output voltage.

An output voltage of the second regulator may be set as the second output voltage, and an output voltage of the first regulator may be set as a first output voltage higher than the second output voltage by a delta voltage.

The first regulator and the second regulator may supply the currents generated by the first output voltage and the second output voltage through identical paths connected to the VDD pad.

The first regulator may include a first resistor connected in series to a second resistor, and the second regulator may include a third resistor connected in series to a fourth resistor. The first output voltage may be ((1+a value of the first resistor/a value of the second resistor)×a first reference voltage), and the second output voltage may be ((1+a value of the third resistor/a value of the fourth resistor)×a second reference voltage). The first resistor, the second resistor, the third resistor, the fourth resistor, the first reference voltage, and the second reference voltage may be determined such that the second output voltage is smaller than the first output voltage by the delta voltage.

The first reference voltage and the second reference voltage may be identical to each other, and a resistance ratio between the first resistor and the second resistor and a resistance ratio between the third resistor and the fourth resistor may be determined differently such that the second output voltage is smaller than the first output voltage by the delta voltage.

A resistance ratio between the first resistor and the second resistor and a resistance ratio between the third resistor and the fourth resistor may be identical to each other, and the first reference voltage and the second reference voltage may be determined differently such that the second output voltage is smaller than the first output voltage by the delta voltage.

In another general aspect, a regulator circuit includes a first regulator configured to supply a first output voltage to a first output terminal, a second regulator configured to supply a second output voltage, which is a voltage reduced by a delta voltage from the first output voltage, to a second output terminal connected to the first output terminal, and a VDD pad connected to the first output terminal and the second output terminal. Both the first regulator and the second regulator supply output voltages in response to a voltage of the VDD pad dropping below a predetermined voltage.

The first regulator may include the first output terminal connected to the VDD pad, a first error amplifier configured to output a first voltage by amplifying a difference between a first reference voltage and a first feedback voltage, a first pass transistor configured to regulate an amount of a first current output through the first output terminal based on the first voltage, and a first voltage divider having a first resistor and a second resistor connected between the first output terminal and a ground terminal and configured to feedback the first feedback voltage generated by the first resistor and the second resistor to the first error amplifier.

The second regulator may include the second output terminal connected to the VDD pad, a second error amplifier configured to output a second voltage by amplifying a difference between a second reference voltage and a second feedback voltage, a second pass transistor configured to regulate an amount of a second current output through the second output terminal based on the second voltage, and a second voltage divider having a third resistor and a fourth resistor connected between the second output terminal and a ground terminal and configured to feedback the second feedback voltage generated by the third resistor and the fourth resistor to the second error amplifier.

The first output voltage may be ((1+a value of the first resistor/a value of the second resistor)×the first reference voltage), and the second output voltage may be ((1+a value of the third resistor/a value of the fourth resistor)×the second reference voltage). The first resistor, the second resistor, the third resistor, the fourth resistor, the first reference voltage, and the second reference voltage may be determined such that the second output voltage is smaller than the first output voltage by the delta voltage.

The first reference voltage and the second reference voltage may be identical to each other, and a resistance ratio between the first resistor and the second resistor and a resistance ratio between the third resistor and the fourth resistor may be determined differently such that the second output voltage is smaller than the first output voltage by the delta voltage.

A resistance ratio between the first resistor and the second resistor and a resistance ratio between the third resistor and the fourth resistor may be identical to each other, and the first reference voltage and the second reference voltage may be determined differently such that the second output voltage is smaller than the first output voltage by the delta voltage.

Other features and aspects will be apparent from the following detailed description, the drawings, and the claims.

Figure 1:
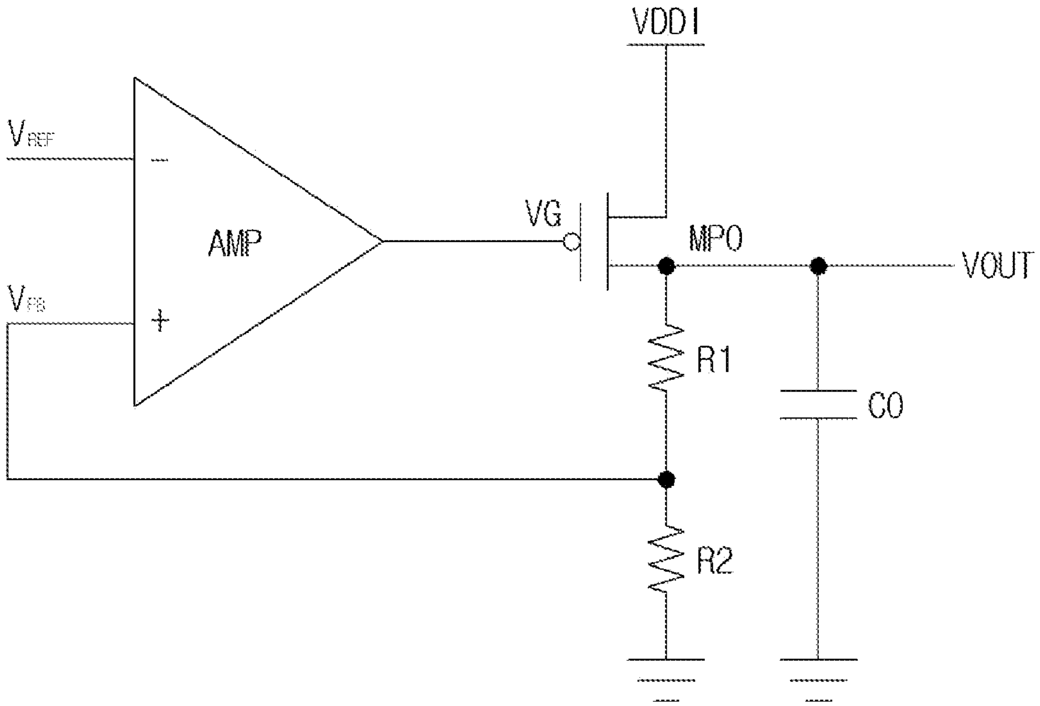
FIG. 1 is a diagram showing a conventional LDO regulator circuit.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

When it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

Various embodiments relate to a regulator circuit and method of driving the same, and to a regulator circuit and a method of driving the same, which reduce a voltage drop caused by load fluctuations using two LDO regulators which supply different output voltages.

The present disclosure aims to solve the above problems, and provides a regulator circuit capable of reducing a voltage drop caused by load fluctuations by using two LDO regulators that supply different output voltages, and a driving method thereof.

FIG. 1 is a block diagram of a conventional LDO regulator circuit.

As shown in FIG. 1, a conventional LDO regulator circuit may include an error amplifier AMP, a pass transistor MP0, and a divider resistor that determines an output voltage VOUT. The error amplifier AMP may detect fluctuations in the output voltage VOUT when the fluctuations occur and regulate the gate voltage of the pass transistor MP0 to maintain the output voltage VOUT at a constant value. For example, when the output voltage VOUT is reduced, a feedback voltage $V_{FB}$ is reduced. When the feedback voltage $V_{FB}$ is smaller than a reference voltage $V_{REF}$, the error amplifier AMP may detect a difference between the feedback voltage $V_{FB}$ and the reference voltage $V_{REF}$ and control the pass transistor MP0 to reduce the difference between the two voltages according to a negative feedback structure. Therefore, a lower voltage is applied to the gate of the pass transistor MP0 to cause more current to flow between the source and drain of the pass transistor MP0, thereby boosting the output voltage VOUT.

Figure 2:
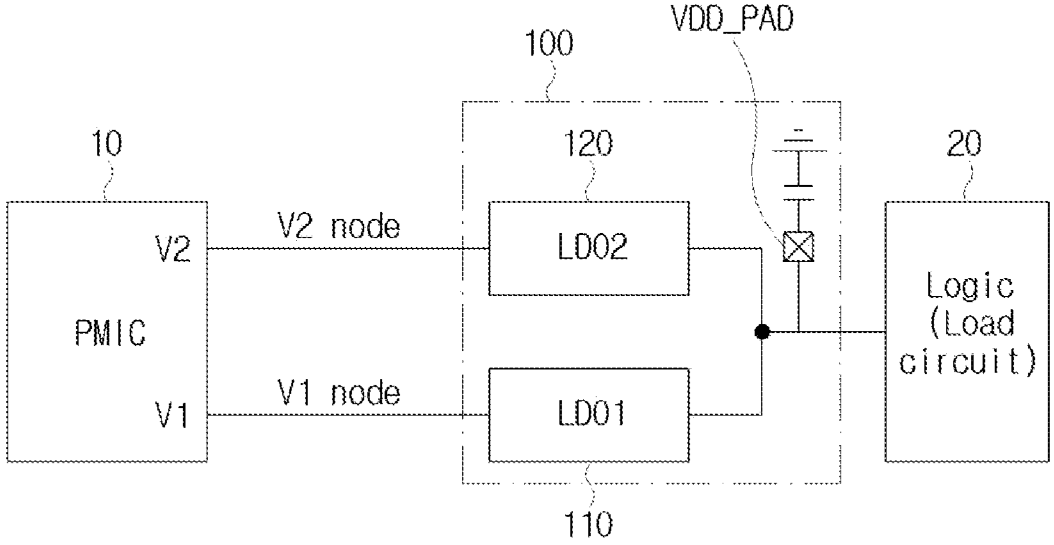
FIG. 2 is a block diagram illustrating a configuration for providing a stable output voltage to a load circuit using two regulators, according to one embodiment of the present disclosure.

FIG. 2 is a block diagram illustrating a configuration for providing a stable output voltage to a load circuit using two regulators, according to one embodiment of the present disclosure.

Referring to FIG. 2, a power management integrated circuit 10 may provide a stable output voltage to a load circuit 20 using a regulator circuit 100.

According to embodiments of the present disclosure, the regulator circuit 100 may include a first regulator 110, a second regulator 120, and a VDD pad VDD_PAD, and may regulate a supply voltage received from the power management integrated circuit 10 to provide output voltages to the VDD pad VDD_PAD connected to the power line of the load circuit 20. In this case, the output terminals of the first and second regulators 110 and 120 may be connected to the VDD pad VDD_PAD, and the levels of the output voltages output from the first and second regulators 110 and 120 may differ.

According to an embodiment, the first regulator 110 may receive a first supply voltage V1 from the power management integrated circuit 10 via a first node (V1 node) and supply a first output voltage Vout1 to the VDD pad VDD_PAD. The second regulator 120 may receive a second supply voltage V2 from the power management integrated circuit 10 via a second node (V2 node) and supply a second output voltage Vout2 to the VDD pad VDD_PAD. The first output voltage Vout1 and the second output voltage Vout2 may be used as supply voltages for the load circuit 20. According to an embodiment, the voltage value of the first supply voltage V1 received from the power management integrated circuit 10 may be identical to the voltage value of the second supply voltage V2 received from the power management integrated circuit 10.

According to embodiments of the present disclosure, the first output voltage Vout1 may be supplied to the load circuit 20 via the first regulator 110. Subsequently, when a relatively large amount of current is instantaneously desired by the load circuit 20, the second regulator 120 may be operated to simultaneously supply a current by the first output voltage Vout1 and a current by the second output voltage Vout2 to the load circuit 20.

In other words, when the amount of load of the load circuit 20 is relatively small or within the capacity of the first regulator 110, the first regulator 110 may be operated alone. When the amount of load of the load circuit 20 is relatively large or exceeds the capacity of the first regulator 110, and a relatively large amount of current is desired by the load circuit 20, the first regulator 110 and the second regulator 120 may be operated together to reduce the voltage drop across the VDD pad VDD_PAD.

Hereinafter, the structures and operations of the first and second regulators 110, 120 constituting the regulator circuit 100 will be described in detail.

Figure 3:
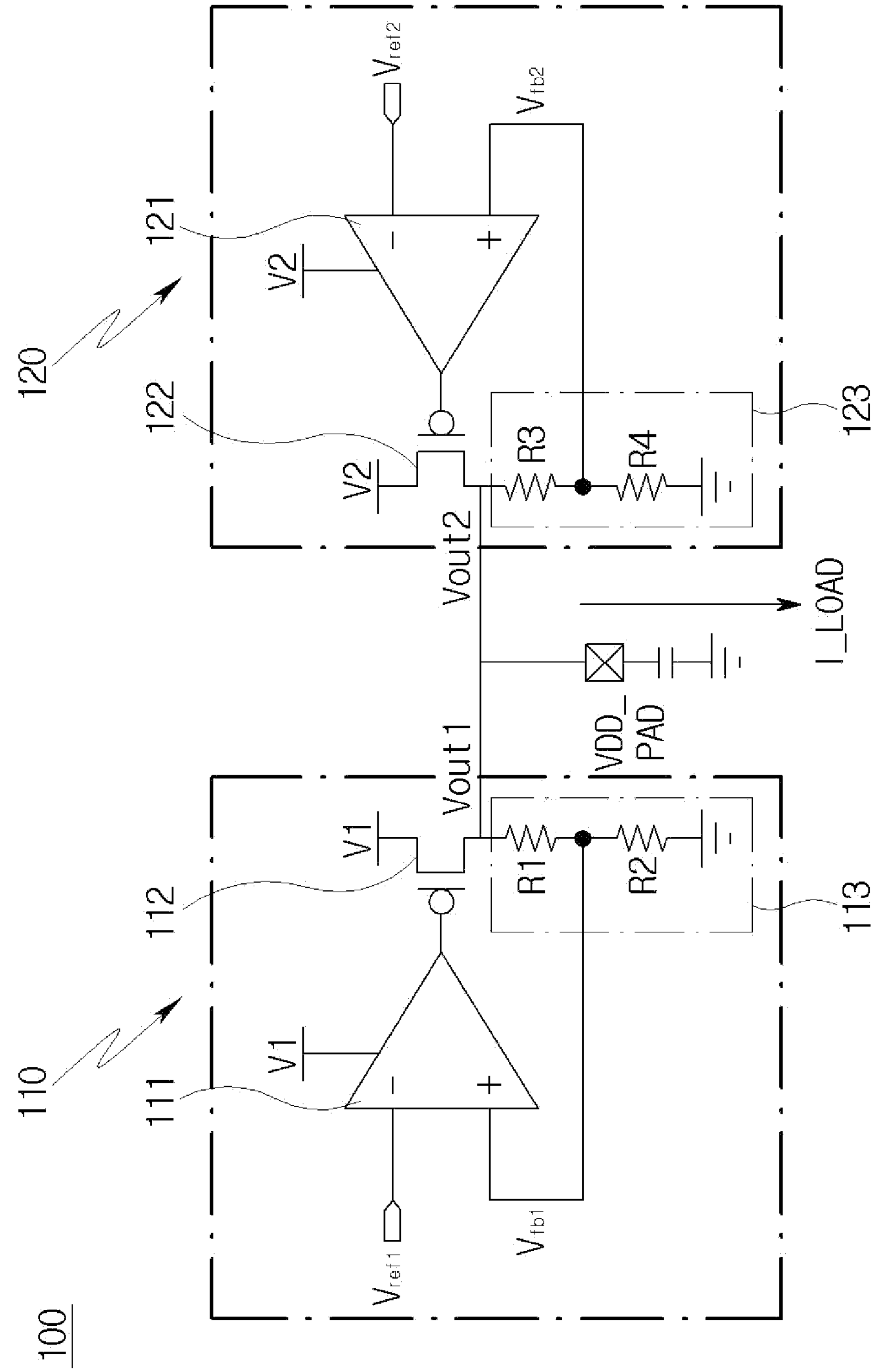
FIG. 3 is a diagram illustrating the regulator circuit according to one embodiment of the present disclosure.

FIG. 3 illustrates the regulator circuit 100 according to one embodiment of the present disclosure.

According to embodiments of the present disclosure, the regulator circuit 100 may include two regulators 110 and 120, which may output different output voltages. When the voltage of the VDD pad VDD_PAD connected to the power line of the load circuit 20 is less than or equal to a certain predetermined voltage, the regulators 110 and 120 may both be operated to allow the current desired by the load circuit 20 to be offloaded by the regulators 110 and 120 together. Accordingly, the regulator circuit 100 proposed in the present disclosure may provide a stable output voltage to the load circuit 20 despite fluctuations in the load of the load circuit 20, thereby improving regulation performance.

According to embodiments of the present disclosure, the regulator circuit 100 may include a first regulator 110 and a second regulator 120. The regulator circuit 100 may supply a first output voltage Vout1 to the load circuit 20 via the first regulator 110. Subsequently, when a relatively large amount of current is desired by the load circuit 20, the regulator circuit 100 may operate the second regulator 120 to simultaneously supply a current by the first output voltage Vout1 and a current by the second output voltage Vout2 to the load circuit 20.

Referring to FIG. 3, the first regulator 110 may include a first error amplifier 111, a first pass transistor 112, and a first voltage divider 113. The second regulator 120 may include a second error amplifier 121, a second pass transistor 122, and a second voltage divider 123.

The first error amplifier 111 may regulate a first voltage output to the gate terminal of the first pass transistor 112 based on a change in a first feedback voltage Vfb1. The first error amplifier 111 may control the first voltage based on the first feedback voltage Vfb1 to make the first output voltage Vout1 relatively constant. For example, the first error amplifier 111 may boost the first output voltage Vout1 by reducing the first voltage when the first feedback voltage Vfb1 decreases and reduce the first output voltage Vout1 by boosting the first voltage when the first feedback voltage Vfb1 increases to make the first output voltage Vout1 constant.

For example, the first error amplifier 111 may receive a first reference voltage Vref1 via a negative input terminal (−) and the first feedback voltage Vfb1 via a positive input terminal (+) and output a first voltage obtained by amplifying a difference between the first reference voltage Vref1 and the first feedback voltage Vfb1 to the gate terminal of the first pass transistor 112. According to embodiments, the first error amplifier 111 may output the first voltage that has been reduced by amplifying a difference component between the first feedback voltage Vfb1 and the first reference voltage Vref1 when the first feedback voltage Vfb1 is less than the first reference voltage Vref1, and may output the first voltage that has been boosted when the first feedback voltage Vfb1 is greater than the first reference voltage Vref1. When the first voltage supplied to the gate terminal of the first pass transistor 112 decreases, a channel formed between the source and the drain of the first pass transistor 112 may be larger to allow more current to pass through the channel, thereby boosting the first output voltage Vout1. On the other hand, when the first voltage increases, the channel formed between the source and drain of the first pass transistor 112 may be smaller to allow less current to pass through the channel, thereby reducing the first output voltage Vout1.

In one or more embodiments, the following relationship between the first reference voltage Vref1 and the first output voltage Vout1 may be established according to Equation 1.

$$V_{out1} = \left(\frac{R_1 + R_2}{R_2}\right) V_{ref1} \quad \text{Equation 1}$$

Thus, the values of a first reference voltage Vref1, a first resistor R1, and a second resistor R2 may be determined to output a desired first output voltage Vout1.

The source terminal of the first pass transistor 112 may be connected to the power management integrated circuit 10 that provides a first supply voltage V1. The drain terminal of the first pass transistor 112 may be connected to one terminal of the first resistor R1. A node between the drain terminal of the first pass transistor 112 and the first resistor R1 may be the first output terminal of the first regulator 110 and connected to the VDD pad VDD_PAD. The first output voltage Vout1 may be output from the first output terminal. The gate terminal of the first pass transistor 112 may be connected to the output of the first error amplifier 111. According to one embodiment, the first pass transistor 112 may be a p-type metal-oxide-semiconductor field-effect transistor (MOSFET) and may operate in a linear region (or triode region).

The first voltage divider 113 may include the first resistor R1 and the second resistor R2. The first resistor R1 and the second resistor R2 may be connected between the first output terminal and the ground terminal of the first regulator 110. In addition, both input terminals (+) of the first error amplifier 111 may be connected between the first resistor R1 and the second resistor R2 of the first voltage divider 113 to receive a first feedback voltage Vfb1 generated by voltage division. In this case, the resistance ratio of the first resistor R1 and the second resistor R2 may be determined based on equation 1 above.

The second error amplifier 121 may regulate a second voltage output to the gate terminal of the second pass transistor 122 based on a change in the second feedback voltage Vfb2. The second error amplifier 121 may boost the second output voltage Vout2 by reducing the second voltage when the second feedback voltage Vfb2 decreases and reduce the second output voltage Vout2 by boosting the second voltage when the second feedback voltage Vfb2 increases to make the second output voltage Vout2 constant.

For example, the second error amplifier 121 may receive a second reference voltage Vref2 via the negative input terminal (−) and a second feedback voltage Vfb2 via the positive input terminal (+) and output a second voltage obtained by amplifying the difference between the second reference voltage Vref2 and the second feedback voltage Vfb2 to the gate terminal of the second pass transistor 122. According to embodiments, the second error amplifier 121 may output a second voltage that has been reduced by amplifying a difference between the second feedback voltage Vfb2 and the second reference voltage Vref2 when the second feedback voltage Vfb2 is smaller than the second reference voltage Vref2, and output a second voltage that has been boosted when the second feedback voltage Vfb2 is larger than the second reference voltage Vref2.

When the second voltage supplied to the gate terminal of the second pass transistor 122 decreases, a channel formed between the source and the drain of the second pass transistor 122 may be larger to allow more current to pass through the channel, thereby boosting the second output voltage Vout2. On the other hand, when the second voltage increases, the channel formed between the source and drain of the second pass transistor 122 may be smaller to allow less current to pass through the channel, thereby reducing the second output voltage Vout2.

In this case, the following relationship between the second reference voltage Vref2 and the second output voltage Vout2 may be established based on Equation 2.

$$V_{out2} = \left(\frac{R_3 + R_4}{R_4}\right) V_{ref2} \qquad \text{Equation 2}$$

Thus, the values of a second reference voltage Vref2, a third resistor R3, and a fourth resistor R4 may be determined to output a desired second output voltage Vout2.

The source terminal of the second pass transistor 122 may be connected to the power management integrated circuit 10 that provides the second supply voltage V2, the drain terminal may be connected to one terminal of the third resistor R3, and a node between the drain terminal of the second pass transistor 122 and the third resistor R3 may be a second output terminal of the second regulator 120 and connected to the VDD pad VDD_PAD. The second output voltage Vout2 may be output from the second output terminal. In addition, the gate terminal of the second pass transistor 122 may be connected to the output of the second error amplifier 121. According to an embodiment, the second pass transistor 122 may be a P-type MOSFET configured to operate in a linear region (or triode region).

The second voltage divider 123 may include the third resistor R3 and the fourth resistor R4. The third resistor R3 and the fourth resistor R4 may be connected between the second output terminal and the ground terminal of the second regulator 120. In addition, both input terminals (+) of the second error amplifier 121 may be connected between the third resistor R3 and the fourth resistor R4 of the second voltage divider 123 to receive a second feedback voltage Vfb2 generated by voltage division. In this case, the resistance ratio of the third resistor R3 and the fourth resistor R4 may be determined based on Equation 2 above.

According to an embodiment, the second output terminal, the first output terminal, and the VDD pad VDD_PAD may be connected to a single node. In this case, the second voltage divider 123 may generate the second feedback voltage Vfb2 through voltage division of a voltage at the node to which the first output terminal, the second output terminal, and the VDD pad VDD_PAD are connected. In other words, the second feedback voltage Vfb2 may be determined by the voltage of a node to which the first output terminal, the second output terminal, and the VDD pad VDD_PAD are connected.

According to various embodiments of the present disclosure, the first output voltage Vout1 output by the first regulator 110 and the second output voltage Vout2 output by the second regulator 120 may be set differently. According to an embodiment, the second output voltage Vout2 is may be set to be smaller than the first output voltage Vout1 by a preset voltage (ΔV, delta voltage) (Vout2=Vout1−ΔV).

According to an embodiment of the present disclosure, when the first reference voltage Vref1 and the second reference voltage Vref2 are set to be identical to each other, the preset voltage ΔV is set according to Equation 3 below, and the second output voltage Vout2 may be set to be smaller than the first output voltage Vout1 by the preset voltage ΔV (Vout2=Vout1−ΔV).

$$R1 > R3,\ R2 = R4 \qquad \text{Equation 3}$$

Alternatively, when the first reference voltage Vref1 is set to be higher than the second reference voltage Vref2, (Vout2=Vout1−ΔV) may be set such that the second output voltage Vout2 is smaller than the first output voltage Vout1 by a preset voltage ΔV by setting the preset voltage ΔV according to the following equation 4.

$$R1 = R3,\ R2 = R4 \qquad \text{Equation 4}$$

Any one or more of the regulator circuits proposed in the present disclosure may be used in a certain logic circuit. Hereinafter, the operation of the regulator circuit 100, including the first regulator 110 and the second regulator 120, will be described.

Figure 4A:
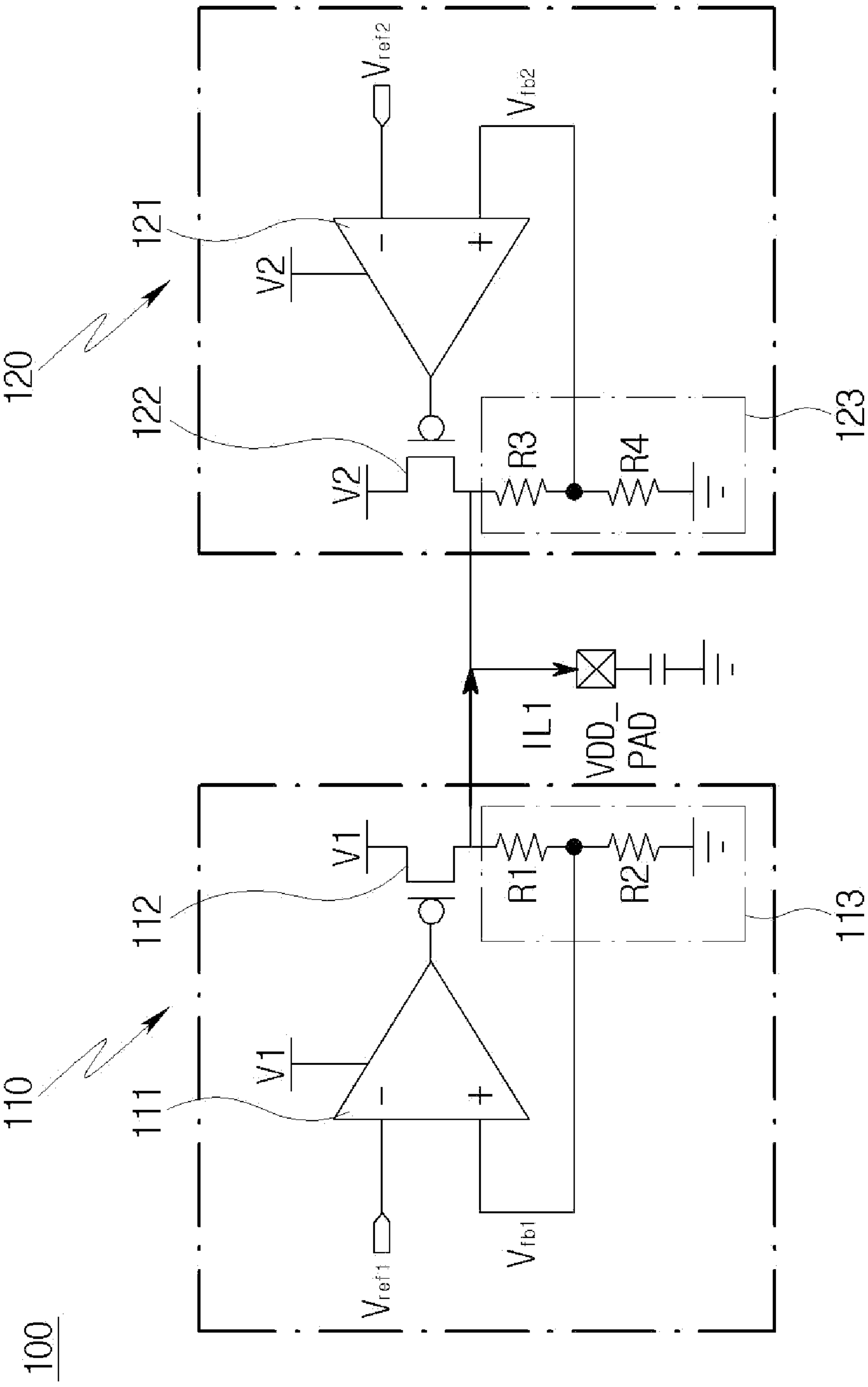
FIGS. 4A to 4C are drawings describing the operation of the regulator circuit according to an embodiment of the present disclosure.
Figure 4B:
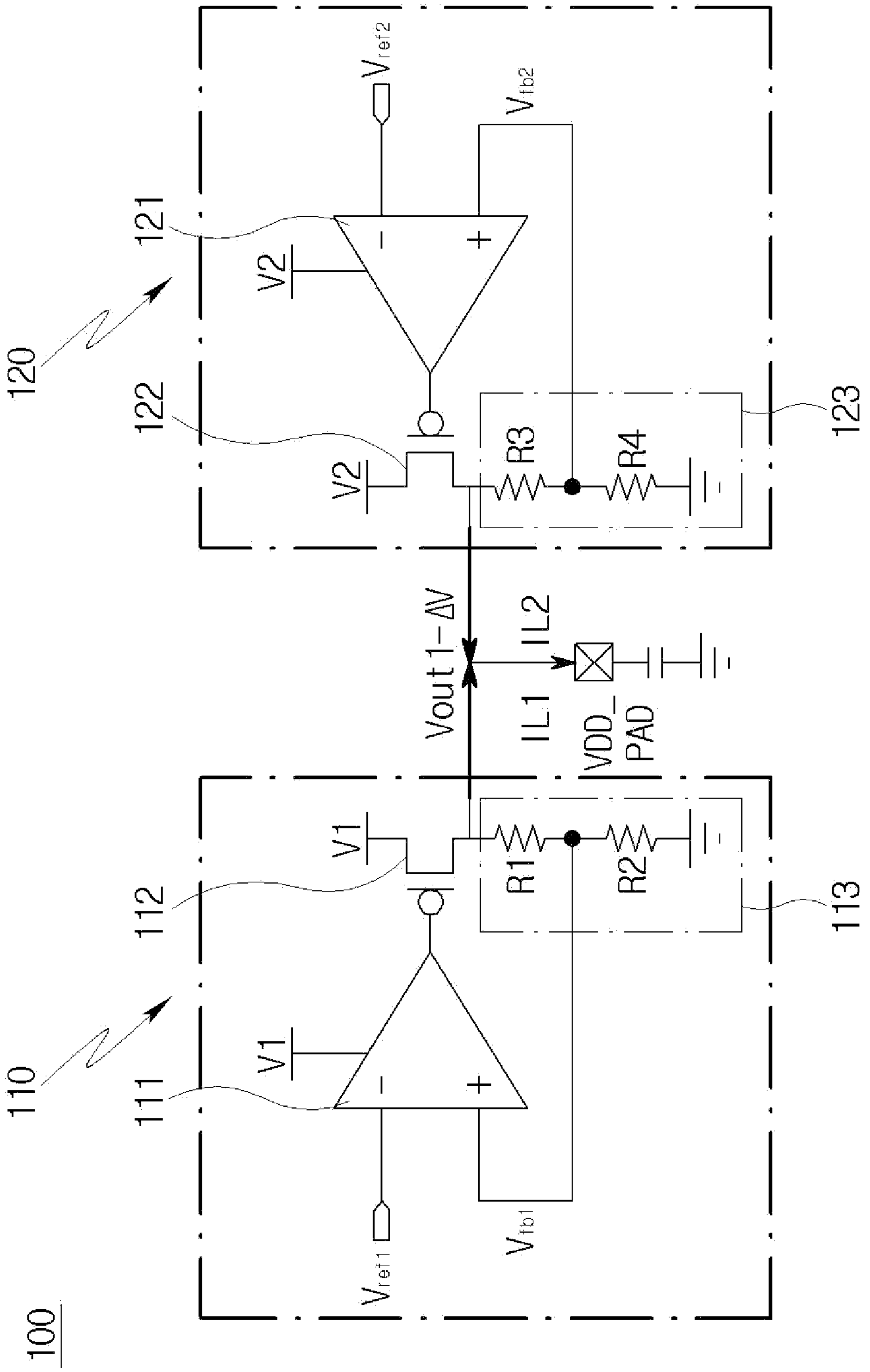
Figure 4C:
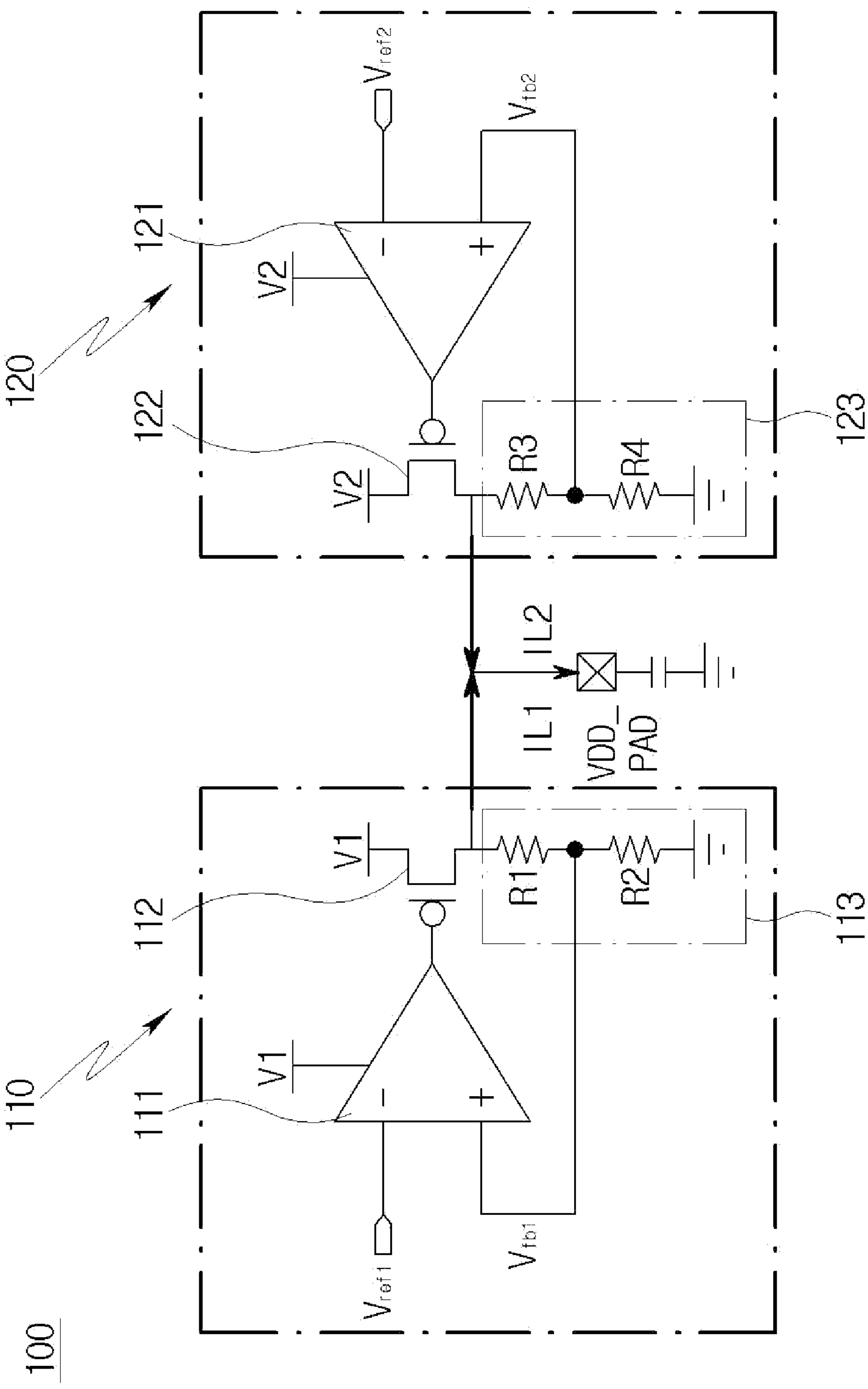
Figure 5:
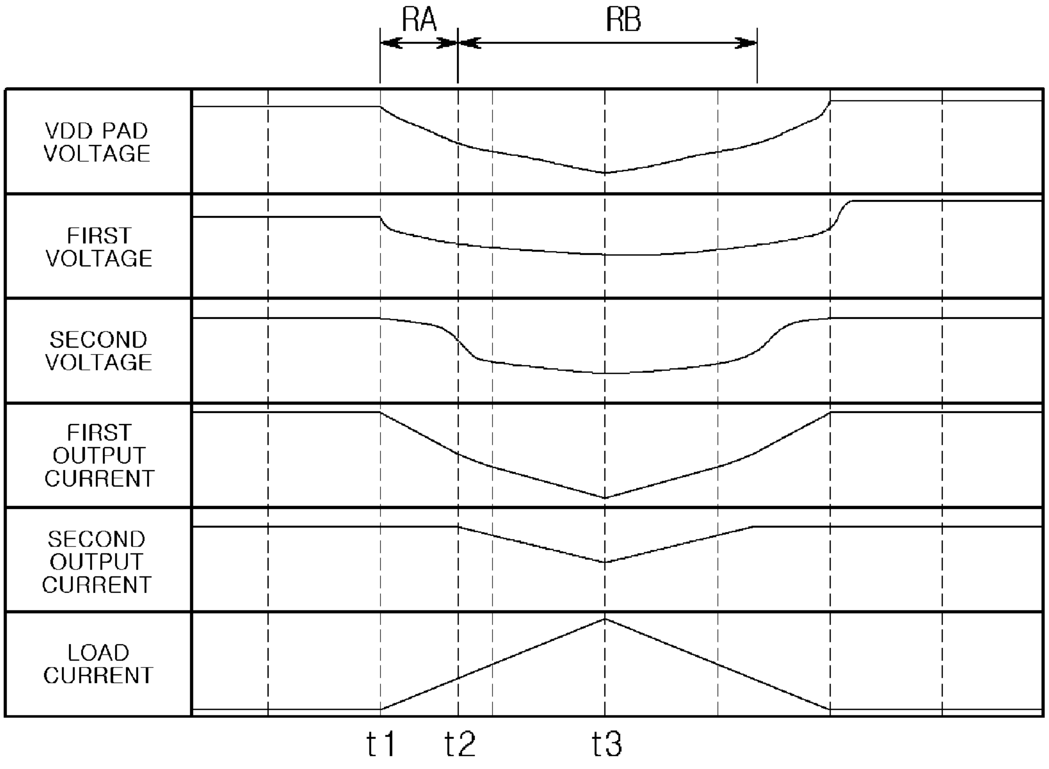
FIG. 5 is a diagram describing the operations of a VDD pad, a first regulator, and a second regulator according to load variation according to an embodiment of the present disclosure.

FIGS. 4A to 4C are drawings describing the operation of the regulator circuit 100 according to an embodiment of the present disclosure. FIG. 5 is a drawing describing the operation of each part of the regulator circuit 100 over time according to an embodiment of the present disclosure.

Referring to FIG. 4A, when the amount of load of the load circuit 20 connected to the VDD pad VDD_PAD is relatively small, and a small amount of current IL1 is merely desired, the first regulator 110 may be operated alone to output a first output voltage Vout1 through the first output terminal and supply the current IL1 desired by the load circuit 20 (e.g., see the area RA in FIG. 5). In this case, since the voltage of the VDD pad (second output terminal) is maintained at the first output voltage Vout1 in the second regulator 120, the second feedback voltage Vfb2 is significantly larger than the second reference voltage Vref2. Accordingly, a channel may not be formed between the source and drain of the second pass transistor 122 because the voltage output from the second error amplifier 121 is considerably high.

As shown in FIG. 5, when the voltage of the VDD pad VDD_PAD is reduced as a load current gradually increases from time point t1, the first feedback voltage Vfb1 is smaller than the first reference voltage Vref1 so that the first voltage is reduced. Accordingly, the first regulator 110 may supply the first output current IL1. On the other hand, since the second feedback voltage Vfb2 also decreases but is still greater than the second reference voltage Vref2, a change in the second voltage of the second regulator 120 may be insignificant.

Thereafter, as shown in FIG. 4B and the area RB of FIG. 5, when the amount of load of the load circuit 20 increases and a larger amount of current is desired, the voltage of the VDD pad VDD_PAD may drop below the second output voltage (Vout1−ΔV) output from the second regulator 120.

When the voltage of the VDD pad VDD_PAD (the voltage of the second output terminal) decreases and drops below the second output voltage (Vout1−ΔV), the second feedback voltage Vfb2 is smaller than the second reference voltage Vref2. As a result, the second voltage decreases, and a channel formed between the source and the drain of the second pass transistor 122 is larger, so that the second regulator 120 supplies a current.

Therefore, as shown in the FIG. 4C and the area RB of FIG. 5, when the amount of load of the load circuit 20 is relatively large, the first regulator 110 and the second regulator 120 may simultaneously supply currents to the load circuit 20 to allow a desired current to be offloaded by the first regulator 110 and the second regulator 120.

Referring to FIG. 5, a load current increases as the amount of load increases from time point t1. The first pass transistor 112 of the first regulator 110 may increase the amount of a current supplied to the first output terminal to supply the current desired by the load circuit 20 in response to an increase in the amount of load of the load circuit 20.

In addition, when the amount of load gradually increases from time point t2, and the voltage of the VDD pad VDD_PAD connected to the power line of the load circuit 20 drops below the second output voltage Vout2, the second pass transistor 122 of the second regulator 120 may supply a current through the second output terminal. At time point t2, the voltage of a node to which the VDD pad VDD_PAD and the first and second output terminals are connected may have a value (Vout1−ΔV) reduced by a preset delta voltage from the first output voltage.

In a period of time between time point t2 and time point t3, the first regulator 110 and the second regulator 120 may offload a current desired by the load circuit 20. In this case, a slope at which the voltage of the VDD pad VDD_PAD drops may be smaller than a slope at which the voltage of the VDD pad VDD_PAD drops between time point t1 and time point t2.

Figure 6:
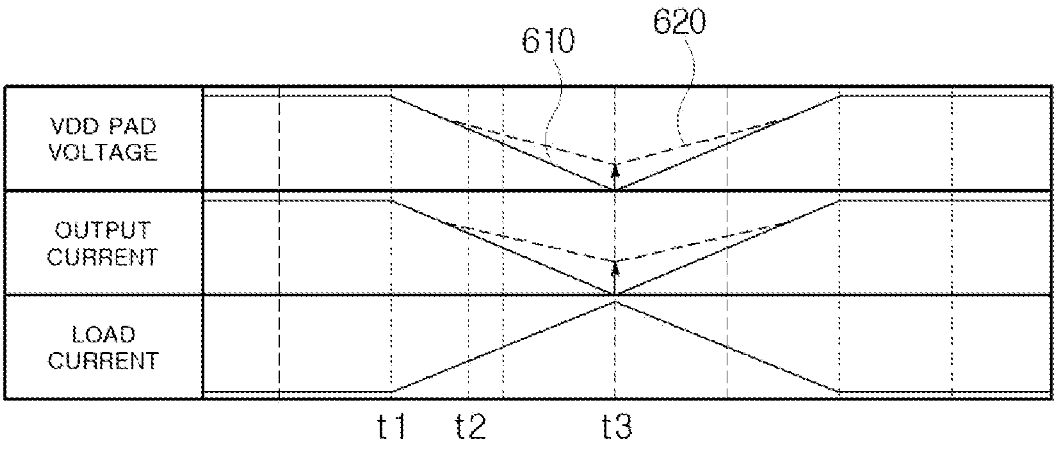
FIG. 6 is a graph for comparing voltage drop characteristics due to load variations between a case where one regulator is included in a regulator circuit and a case where two regulators are included in the regulator circuit according to an embodiment of the present disclosure.

FIG. 6 is a graph for comparing voltage drop characteristics due to load variations between a case where one regulator is included in a regulator circuit and a case where two regulators are included in the regulator circuit according to an embodiment of the present disclosure. For reference, in the graph of FIG. 6, a solid line 610 represents a voltage drop when there is one regulator, and a dotted line 620 represents a voltage drop when there are two regulators.

Referring to FIG. 6, when there are two regulators, a voltage drop of the same slope as when one regulator is operated is exhibited until the other regulator is operated after one regulator has been operated.

Thereafter, when the voltage of the VDD pad VDD_PAD drops below a specific voltage due to an increase in the amount of load of the load circuit 20, both two regulators are operated in the regulator circuit indicated by the dotted line 620 to allow a desired current by the load circuit 20 to be offloaded by the two regulators, reducing a voltage drop in the VDD pad VDD_PAD. That is, when there are two regulators, it is possible to make the slope of the voltage drop more gently than when there is only one regulator.

As described above, according to the regulator circuit and its driving method according to various embodiments of the present disclosure, it is possible to improve regulation performance by providing a stable output voltage to a load circuit using two LDO regulators supplying different output voltages.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A regulator circuit comprising:

a first regulator configured to supply a first current to a VDD pad connected to a power line based on a first output voltage; and a second regulator configured to supply a second current to the VDD pad based on a second output voltage, wherein the first regulator operates with a first reference voltage and the second regulator operates with a second reference voltage that is lower than the first reference voltage such that the second output voltage is lower than the first output voltage by a predetermined delta voltage, and wherein the second regulator is configured to supply the second current in response to a voltage of the VDD pad dropping below the second output voltage.

2. The regulator circuit of claim 1, wherein the first regulator comprises:

a first output terminal connected to the VDD pad;

a first error amplifier configured to output a first voltage by amplifying a difference between the first reference voltage and a first feedback voltage;

a first pass transistor configured to regulate an amount of the first current output through the first output terminal based on the first voltage; and a first voltage divider having a first resistor and a second resistor connected between the first output terminal and a ground terminal and configured to feedback the first feedback voltage generated by the first resistor and the second resistor to the first error amplifier.

3. The regulator circuit of claim 2, wherein the second regulator comprises:

a second output terminal connected to the VDD pad;

a second error amplifier configured to output a second voltage by amplifying a difference between the second reference voltage and a second feedback voltage;

a second pass transistor configured to regulate an amount of the second current output through the second output terminal based on the second voltage; and a second voltage divider having a third resistor and a fourth resistor connected between the second output terminal and a ground terminal and configured to feedback the second feedback voltage generated by the third resistor and the fourth resistor to the second error amplifier.

4. The regulator circuit of claim 3, wherein the first output terminal and the second output terminal are connected to each other.

5. The regulator circuit of claim 4, wherein the first output voltage is ((1+a value of the first resistor/a value of the second resistor)×the first reference voltage), and the second output voltage is ((1+a value of the third resistor/a value of the fourth resistor)×the second reference voltage), and wherein the first resistor, the second resistor, the third resistor, the fourth resistor, the first reference voltage, and the second reference voltage are determined such that the second output voltage is smaller than the first output voltage by the delta voltage.

6. A method of operating a regulator circuit including a first regulator and a second regulator that supply currents to a VDD pad connected to a power line, the method comprising:

supplying, by the first regulator, a current to the VDD pad in response to a voltage of the VDD pad being greater than or equal to a second output voltage; and supplying, by both the first and second regulators, currents to the VDD pad in response to the voltage of the VDD pad dropping below the second output voltage, wherein an output voltage of the first regulator is set to a first output voltage and an output voltage of the second regulator is set to a second output voltage that is lower than the first output voltage by a predetermined delta voltage, the first regulator using a first reference voltage and the second regulator using a second reference voltage different from the first reference voltage to establish the predetermined delta voltage.

7. The method of claim 6, wherein the first regulator and the second regulator supply the currents generated by the first output voltage and the second output voltage through identical paths connected to the VDD pad.

8. The method of claim 7, wherein the first regulator comprises a first resistor connected in series to a second resistor, and the second regulator comprises a third resistor connected in series to a fourth resistor, wherein the first output voltage is ((1+a value of the first resistor/a value of the second resistor)×the first reference voltage), and the second output voltage is ((1+a value of the third resistor/a value of the fourth resistor)×the second reference voltage), and wherein the first resistor, the second resistor, the third resistor, the fourth resistor, the first reference voltage, and the second reference voltage are determined such that the second output voltage is smaller than the first output voltage by the delta voltage.

9. A regulator circuit comprising:

a first regulator configured to supply a first output voltage to a first output terminal;

a second regulator configured to supply a second output voltage, which is set to be lower than the first output voltage by a predetermined delta voltage, to a second output terminal connected to the first output terminal; and a VDD pad connected to the first output terminal and the second output terminal, wherein the first regulator uses a first reference voltage and the second regulator uses a second reference voltage that is lower than the first reference voltage such that the second output voltage is lower than the first output voltage by the predetermined delta voltage, and wherein both the first regulator and the second regulator are configured to supply output voltages in response to a voltage of the VDD pad dropping below the second output voltage.

10. The regulator circuit of claim 9, wherein the first regulator comprises:

the first output terminal connected to the VDD pad;

a first error amplifier configured to output a first voltage by amplifying a difference between the first reference voltage and a first feedback voltage;

a first pass transistor configured to regulate an amount of a first current output through the first output terminal based on the first voltage; and a first voltage divider having a first resistor and a second resistor connected between the first output terminal and a ground terminal and configured to feedback the first feedback voltage generated by the first resistor and the second resistor to the first error amplifier.

11. The regulator circuit of claim 10, wherein the second regulator comprises:

the second output terminal connected to the VDD pad;

a second error amplifier configured to output a second voltage by amplifying a difference between the second reference voltage and a second feedback voltage;

a second pass transistor configured to regulate an amount of a second current output through the second output terminal based on the second voltage; and a second voltage divider having a third resistor and a fourth resistor connected between the second output terminal and a ground terminal and configured to feedback the second feedback voltage generated by the third resistor and the fourth resistor to the second error amplifier.

12. The regulator circuit of claim 11, wherein the first output voltage is ((1+a value of the first resistor/a value of the second resistor)×the first reference voltage), and the second output voltage is ((1+a value of the third resistor/a value of the fourth resistor)×the second reference voltage), and wherein the first resistor, the second resistor, the third resistor, the fourth resistor, the first reference voltage, and the second reference voltage are determined such that the second output voltage is smaller than the first output voltage by the delta voltage.

* * * * *